July 30, 1968  R. W. HANSON  3,395,317

TRANSISTOR FILTER PROTECTION CIRCUIT

Filed Feb. 23, 1966

INVENTOR.
Robert W. Hanson
BY
*Nicholas A. Camasto*
ATTY.

United States Patent Office 3,395,317
Patented July 30, 1968

3,395,317
TRANSISTOR FILTER PROTECTION CIRCUIT
Robert W. Hanson, Glendale Heights, Ill., assignor to Admiral Corporation, Chicago, Ill., a corporation of Delaware
Filed Feb. 23, 1966, Ser. No. 529,414
2 Claims. (Cl. 317—33)

ABSTRACT OF THE DISCLOSURE

A completely self-protective transistorized filter circuit including a transistor having its collector and base electrodes interconnected by a Zener diode and its emitter and base electrodes connected across a voltage divider bias network. In the event of a short circuit in the load circuit, the Zener diode conducts to clamp the base of the transistor to substantially ground potential thereby driving the transistor into saturation and limiting the rise of emitter-collector potential. A thermally actuated circuit breaker is thus enabled to more quickly respond to isolate the circuit under fault conditions.

---

This invention relates in general to transistor power supplies and particularly to such power supplies employing active filter elements as distinct from R-L-C passive filter types in general use.

With the growing acceptance of semiconductor circuitry in the entertainment products field, much effort has been expended to produce economical power supplies capable of delivering the relatively large direct currents required. Since these power supplies may contain relatively costly semiconductor components, means must be provided for their protection in the presence of transient voltages and short circuits.

In accordance with one form of the invention, an active filter transistor is protected against short circuits by a relatively inexpensive Zener diode connected across its output elements. In another form of the invention, an active power filter including a so-called capacity multiplier is fully protected by use of the above mentioned Zener diode in conjunction with a conventional diode.

Accordingly, a primary object of the invention is to provide an improved semiconductor power supply.

Another object of the invention is to provide means for protecting a transistor under abnormal operating conditions.

A further object of the invention is to provide a transistor protection circuit utilizing a low cost Zener diode.

A still further object of this invention is to provide an economical transistorized power supply which is immune from damage under transient and short circuit conditions.

Figure 1:
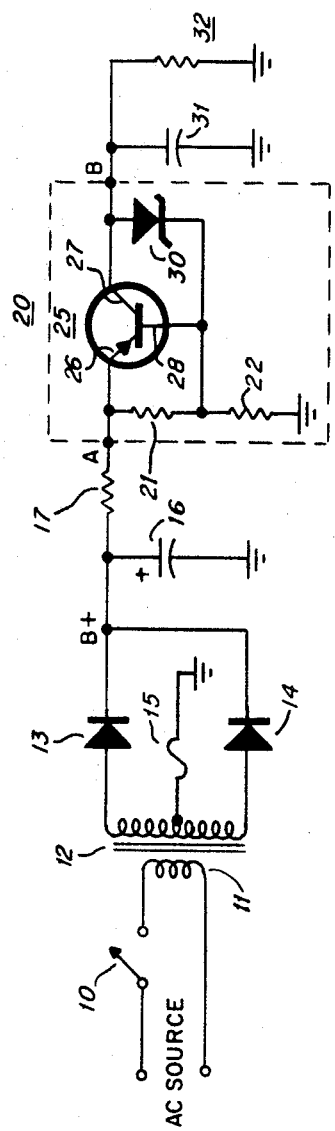
Figure 2:
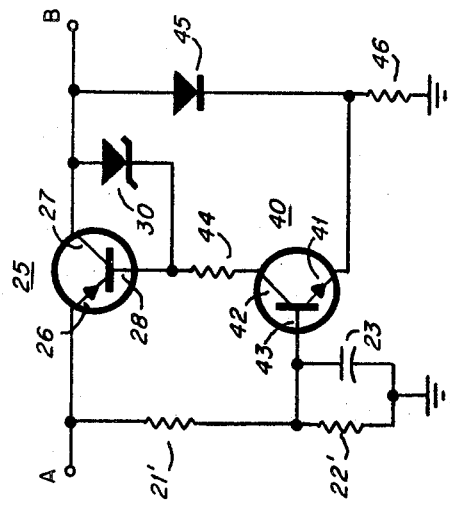

Further objects of this invention will be apparent to those skilled in the art upon reading the following description in conjunction with the drawing in which FIG. 1 represents a schematic diagram of a power supply incorporating the invention and FIG. 2 represents a modification of a portion of the diagram of FIG. 1.

Referring to FIG. 1, an AC source is connectable by a switch 10 to the primary 11 of a conventional transformer. A center tapped secondary winding 12 of the transformer is connected as shown with each end individually feeding diodes 13 and 14, respectively. The center tap on winding 12 is connected through a thermal fuse element or circuit breaker 15 to a point of reference potential, hereinafter referred to as ground. The respective cathodes of diodes 13 and 14 are connected together and constitute a familiar B+ point. At this point there is a positive DC potential and a much smaller AC ripple voltage. A filter capacitor 16 is connected from this B+ point to ground and serves to reduce the ripple voltage. Filter capacitor 16 is also connected through a current limiting resistor 17 to an input terminal A.

Input terminal A and corresponding output terminal B are used to conveniently delineate the active filter circuit enclosed in dashed line box 20. This circuit comprises a transistor 25 having an emitter electrode 26, a collector electrode 27 and a base electrode 28. A bias network, consisting of a pair of resistors 21 and 22, is serially connected from terminal A to ground and the junction of the resistors is connected to base 28 of transistor 25. A Zener diode 30 is bridged across collector 27 and base 28.

Another filter capacitor 31 is connected between output terminal B and ground. A load circuit 32, indicated for simplicity by a resistor, is connected in parallel with capacitor 31. The circuit as described is capable of supplying load circuit 32 with a relatively ripple free DC voltage obtained from the AC source.

In operation, rectifiers 13 and 14 provide full wave rectification for the AC voltage appearing across secondary winding 12. As mentioned previously, filter capacitor 16 tends to reduce the ripple voltage somewhat and the voltage appearing at terminal A thus consists of a DC component and a small AC ripple component. Transistor 25 is of the PNP type and therefore requires a positive bias between emitter 26 and base 28 for conduction to occur between emitter 26 and collector 27. In practice about 0.2 volt emitter to base is required to forward bias a germanium transistor. Resistor 21 is very small compared to resistor 22, insuring that the emitter-base voltage is very small at all times. Consequently, large voltage swings (such as those caused by the AC ripple) are restricted as to their effect on the emitter-base (and hence emitter-collector) current. The result is that most of the ripple is suppressed and the DC potential appearing at output terminal B has a low AC ripple content. The voltage is further filtered by a large filter capacitor 31 and supplied to load resistor 32.

Considering filter capacitor 16 as the effective DC source, it will be seen that a series circuit exists through resistor 17, the emitter-collector junction of transistor 25 and load circuit 32. Consequently, in the event of a short circuit occurring in load circuit 32 (ignoring Zener diode 30 for the moment) a large potential is developed across the emitter-collector junction. As the emitter-base junction bias is restricted, the effective impedance of the emitter-collector junction of transistor 25 is relatively high and conditions are present which may readily lead to an emitter-collector voltage breakdown and consequent destruction of the transistor. Under these conditions circuit breaker 15 will not open until a relatively long period of time has elapsed since transistor 25 is not conducting a heavy current even under the short circuit condition.

Assuming now that the short circuit occurs with Zener diode 30 connected as shown, it will be seen that base 28 of transistor 25 is immediately clamped at a potential with respect to ground equal to the Zener potential of the diode. Thus, the bias on transistor 25 is rapidly increased and transistor 25 is driven into emitter-collector current saturation with a consequent marked decrease in the effective emitter-collector impedance. Now transistor 25 conducts a much heavier current but, more importantly, experiences a very low collector-emitter voltage drop and the danger of voltage breakdown is eliminated. Resistor 17 is selected to limit the maximum current of transistor 25 to a safe level. Meanwhile, the short circuit current is substantially higher in the circuit and circuit breaker 15 rapidly opens. Thus, transistor 25 is protected from the damaging high potential which would normally exist between emitter 26 and collector 27 under short circuit conditions. Further by connecting Zener diode 30 across the collector-base junction as shown, a relatively low power protective device is required.

For acceptable ripple levels, the output filter capacitor 31 in the above described circuit must be quite large and therefore expensive. The effect of a large output filter capacitor may be realized by a modification of the circuit to incorporate what is colloquially referred to as a capacity multiplier. A circuit employing a capacity multiplier as well as the protective features of the invention is shown in FIG. 2. It should be noted that the capacity multiplier itself is not a part of this invention.

In FIG. 2 the elements enclosed in the dashed line box 20 of FIG. 1 have been redrawn to reflect the addition of a transistor 40 and its associated circuitry to obtain the benefits of a capacity multiplier. Transistor 25 and Zener diode 30 remain the same and bear like reference designations. The bias network consists of a serially connected pair of resistors 21' and 22', the junction of which is connected to base 43 of transistor 40. Collector 42 is connected through a load resistor 44 to base 28 of transistor 25 and emitter 41 is connected to ground through a resistor 46. A conventional diode 45 connects output terminal B to the junction of emitter 41 and resistor 46. This diode is utilized for protective purposes (as disclosed in the prior art) as will be explained hereinafter. The purpose of diode 45 is simply to reference emitter 41 to the output for AC but to isolate it therefrom for DC (at least for DC of one polarity). A capacitor 23 is connected in parallel with resistor 22' and is selected such that the output ripple voltage is a desired minimum. In this type of circuit the ripple appearing at base 43 of transistor 40 has the same magnitude as the ripple appearing in the output. Hence capacitor 23 must be selected properly.

Transistor 40 is of the NPN type and consequently is driven conductive responsive to its base 43 being more positive than its emitter 41. Under quiescent conditions, diode 45 is conducting and emitter 41 thus sees the potential existing at terminal B. If this potential increases, the forward bias on transistor 40 decreases since its base-emitter junction bias decreases. The decreased bias is reflected in less collector-emitter current in transistor 40 and consequently the emitter-base bias current for transistor 25 decreases. A decrease in this latter bias current produces an increase in the emitter-collector effective impedance of transistor 25, which reduces the potential at terminal B.

Similarly, if the potential at terminal B decreases, emitter 41 becomes less positive and the forward bias on transistor 40 increases. Responsive to this increase in forward bias, transistor 25 is driven more heavily conductive with a consequent decrease in its emitter-collector effective impedance which increases the potential at output terminal B. The whole cycle is tied to the filtering effect of capacitor 23 which, when referenced to output terminal B, appears to be greatly magnified and in essence produces the same filtering action as a much larger output filter capacitor. It will be understood, of course, that no claim is made to the capacity multiplier circuit per se, which is known in the art, nor to the application of diode 45.

The use of diode 45 maintains emitter 41 at the potential of terminal B for AC but isolates emitter 41 from the output in the event of a short circuit. Thus if the potential of terminal B should suddenly fall to zero, transistor 40 would be relatively unaffected since the zero potential would not be reflected to its emitter 41. Practically speaking, about half of the current in resistor 46 is supplied through diode 45 and therefore the voltage drop across this resistor will decrease somewhat, thus increasing the forward bias on transistor 40. Transistor 25 is again placed in jeopardy since its effective emitter-collector impedance is still high. However, Zener diode 30 causes base 28 to be driven heavily negative with respect to emitter 26 and forces transistor 45 into emitter-collector current saturation. Thus the action as described with respect to FIG. 1 is repeated and circuit breaker 15 rapidly opens to disconnect the power supply.

What has been described is a novel power supply circuit employing active filter elements which are protected against transient and short circuit conditions by relatively simple and inexpensive means. It is understood that numerous modifications and changes in the circuits shown and described may be readily envisioned of those skilled in the art without departing from the true spirit and scope of the invention as set forth in the claims.

The embodiments of the invention in which an exclusive property or privilege is claimed are defined as follows:

1. A transistorized power supply comprising: means supplying alternating current; full wave rectifier means converting said alternating current into direct current; a voltage divider network, including first and second portions, coupled across said full wave rectifier means; a transistor having an emitter electrode, a collector electrode and a base electrode; said emitter electrode and said base electrode being connected across said first portion of said voltage divider network and being supplied drive voltage therefrom; a load circuit connected to said collector electrode; a Zener diode interconnecting said collector electrode and said base electrode; a thermally operated circuit breaker connected between said rectifier means and said transistor for protecting said transistor and load circuit under abnormal operating conditions; said Zener diode shorting out said second portion of said voltage divider in the event of a short circuit occurring across said load circuit; said transistor being heavily driven into saturation, and thereby minimizing the effective resistance between said emitter and said collector electrodes and increasing the fault current flowing in said thermoelectric device.

2. A transistorized power supply as set forth in claim 1 further including a current limiting resistor interposed between said recttifier means and said voltage divider network for restricting the maximum current through said emitter and collector electrodes to a safe value for said transistor.

References Cited

UNITED STATES PATENTS

| | | | |
|---|---|---|---|
| 3,202,904 | 8/1965 | Madland | 321—14 X |
| 3,237,087 | 2/1966 | Greenberg | 317—33 X |
| 3,250,979 | 5/1966 | Shaw. | |
| 3,317,819 | 5/1967 | Brodie | 321—10 X |

FOREIGN PATENTS

| | | |
|---|---|---|
| 1,085,203 | 7/1960 | Germany. |

OTHER REFERENCES

Honeywell application notes/semiconductor product. "Power Transistor 'Ripple Clipper' Filter for High-Current D.C. Power Supply Use," Mar. 15, 1959.

LEE T. HIX, *Primary Examiner.*

W. H. BEHA, JR., *Assistant Examiner.*